US008452072B2

(12) United States Patent (10) Patent No.: US 8,452,072 B2
Sukegawa et al. (45) Date of Patent: May 28, 2013

(54) METHOD AND APPARATUS FOR INSPECTING TIRE SHAPE

(75) Inventors: Tetsuya Sukegawa, Tokyo (JP); Taro Takebuchi, Tokyo (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 190 days.

(21) Appl. No.: 12/735,001

(22) PCT Filed: Nov. 12, 2008

(86) PCT No.: PCT/JP2008/070606
§ 371 (c)(1),
(2), (4) Date: Jun. 25, 2010

(87) PCT Pub. No.: WO2009/075156
PCT Pub. Date: Jun. 18, 2009

(65) Prior Publication Data
US 2010/0296738 A1 Nov. 25, 2010

(30) Foreign Application Priority Data
Dec. 10, 2007 (JP) ................................. 2007-317876

(51) Int. Cl.
*G06T 1/00* (2006.01)

(52) U.S. Cl.
USPC .......................................... 382/141; 382/280

(58) Field of Classification Search
USPC ......................................................... 382/103
See application file for complete search history.

(56) References Cited

U.S. PATENT DOCUMENTS 7,260,983 B2 * 8/2007 Nosekabel et al. ............. 73/146
8,305,436 B2 * 11/2012 Fujisawa et al. ................ 348/92

FOREIGN PATENT DOCUMENTS

| JP | A-5-187843 | 7/1993 |
| JP | A-05-215530 | 8/1993 |
| JP | A-11-138654 | 5/1999 |
| JP | A-2004-340805 | 12/2004 |
| JP | A-2004-361344 | 12/2004 |
| JP | A-2005-121450 | 5/2005 |
| JP | A-2007-147323 | 6/2007 |

OTHER PUBLICATIONS

Koung-Suk Kim, Quantitative Evaluation of Defect inside Tire by Shearography, Aug. 15, 2004, Key Engineering Materials, vol. 270-273.*

(Continued)

*Primary Examiner* — M. Thein
*Assistant Examiner* — Milena Racic
(74) *Attorney, Agent, or Firm* — Oliff & Berridge, PLC (57) ABSTRACT

A method and apparatus for accurately detecting the shape of a tire side by performing an image processing of removing a knurled region from the tire side. An actual image of a tire side having a knurled region obtained by a light-section method is Fourier-transformed into a Fourier-transformed image by a Fourier-transformed image creating unit of an image processing means. Cross-shaped peaks appearing discretely at predefined frequency intervals on a straight line in the Fourier-transformed image are identified as peaks attributable to the knurled region by a knurled component identifying unit. The cross-shaped peaks are removed from the Fourier-transformed image by a knurl component removing unit, and the Fourier-transformed image from which the peaks are removed is inverse-Fourier-transformed into an actual image by an inverse-Fourier-transforming unit. And the acceptability of the shape of the tire side is determined using the actual image.

11 Claims, 6 Drawing Sheets

OTHER PUBLICATIONS

International Search Report issued on Dec. 22, 2008 in International Application No. PCT/JP2008/070606 (with translation).

Tsai et al., "Automated surface inspection for directional textures," *Image and Vision Computing*, vol. 18, No. 1, Dec. 1, 1999, pp. 49-62.

Mar. 6, 2012 Extended Search Report issued in European Application No. 08858779.5.

Jan. 3, 2013 Office Action issued in European Patent Application No. 08 858 779.5.

D.-M. Tsai et al., "Automated Surface Inspection for Directional Textures", Image and Vision Computing, vol. 18, No. 1, Dec. 1, 1999.

* cited by examiner

METHOD AND APPARATUS FOR INSPECTING TIRE SHAPE

TECHNICAL FIELD

The present invention relates to a method and apparatus for inspecting the shape of a tire and more particularly to a shape inspection of a tire having a knurled pattern formed on the tire side.

BACKGROUND ART

Figure 5:
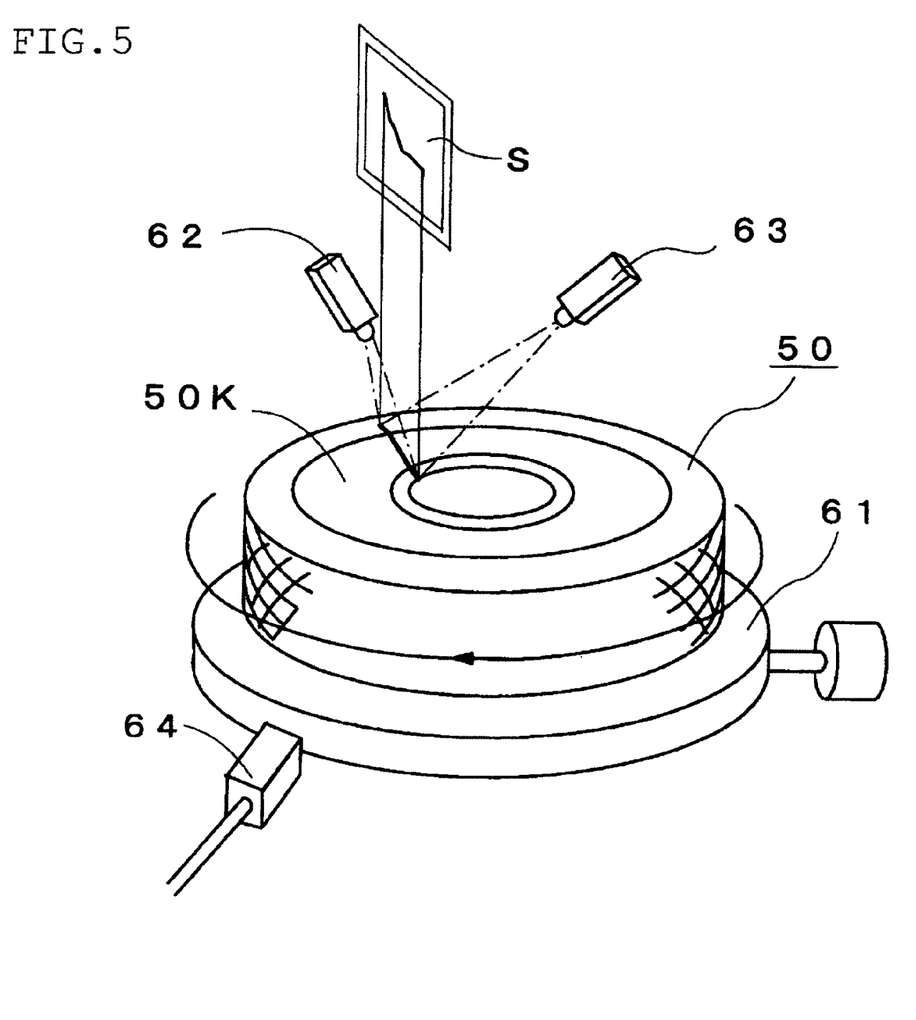
FIG. 5 is an illustration showing a schema of a conventional method for determining the tire shape.

An inspection method using a light-section method as illustrated in FIG. 5 is conventionally known as an inspection method for determining the acceptability of the shape of a tire side. In such an inspection method, a tire 50 to be inspected is mounted on a rotating unit 61 and rotated with its axis as the axis of rotation. At the same time, a slit light is cast to the side (tire side) 50K of the tire 50 by a light casting unit 62 using semiconductor laser or the like, and slit images of the side 50K are shot by an area camera 63 such as a CCD camera. Then the shape of the side 50K is derived from the image data (luminance data) of the slit images S, and the acceptability of the shape is determined by comparing it against a reference image (inspection image) of the side of a tire. To be more specific, the center coordinates of the pixels bright with light, out of the image data of the slit images S, are calculated, and the two-dimensional coordinates of the slit images S are calculated. Then the two-dimensional coordinates are converted into three-dimensional coordinates using the positional relationship between the casting angle of the slit light and the shooting angle of the slit image S and the angle of rotation of the tire 50 detected by a rotation angle detecting unit 64, and in this way the contour (external form) and unevenness along the vertical tire cross section of the side 50K of the tire 50 is detected. Then the acceptability of the shape of the tire 50 is determined by comparing the detected image of the side 50K against the reference image of the tire side (see Reference 1, for instance).

Reference 1: Japanese Unexamined Patent Application Publication No. 11-138654

DISCLOSURE OF THE INVENTION

Problems to be Solved by the Invention

It is to be noted that the side 50K of a tire 50 has a region where a string of letters representing the tire markings, such as section width and tire profile of the tire 50, name of the tire maker, and the like is formed. And such a string of letters poses an obstacle to the inspection of acceptability of the shape of the side 50K. Conventionally, therefore, in carrying out an inspection, an image from which the string of letters is removed is created by masking an image obtained by the light-section method with a model image including letter images, and then the acceptability of the shape of the side 50K is determined using the image with the string of letters removed.

Figure 6:
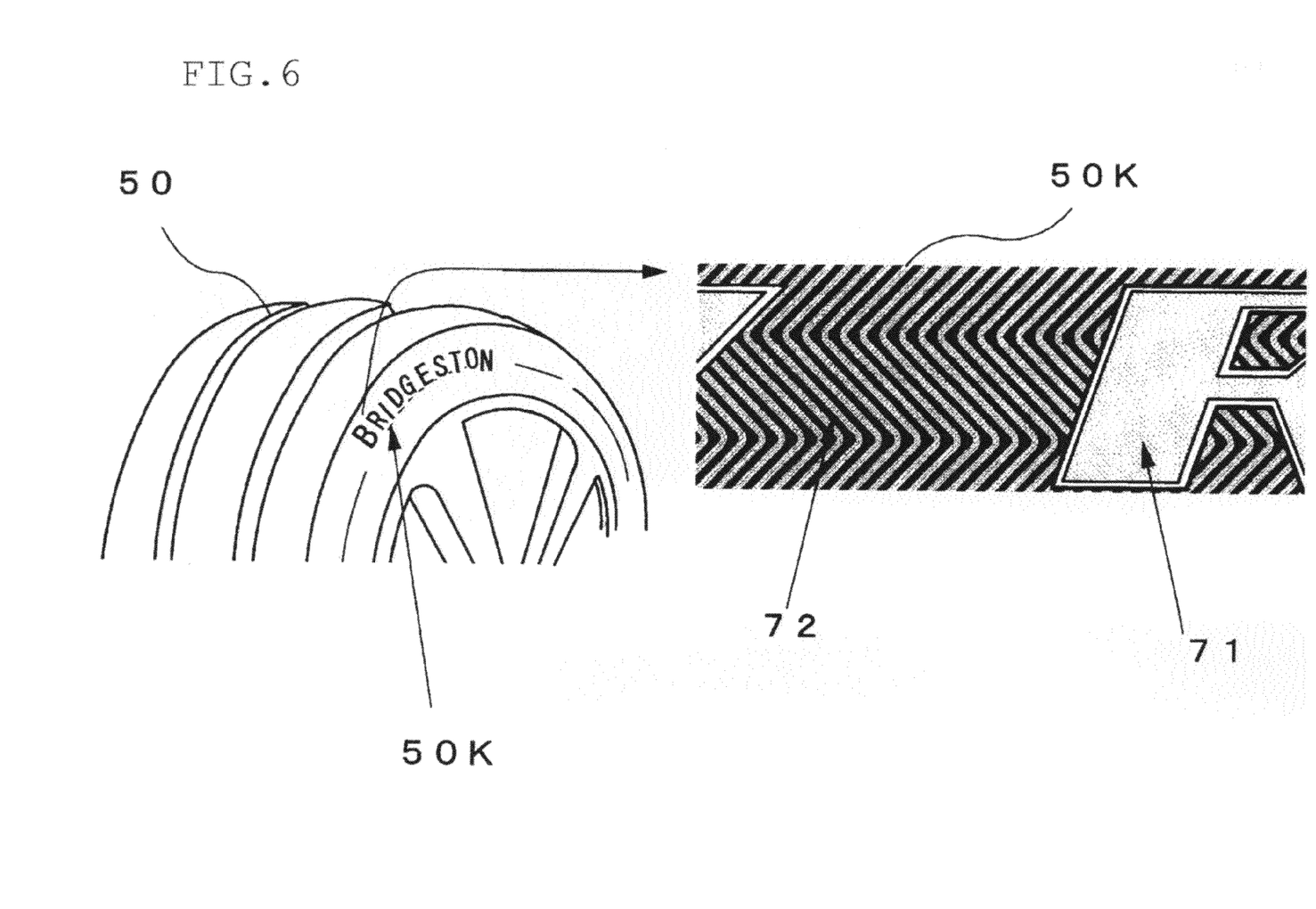
FIG. 6 is an illustration showing an example of a knurled region formed on a tire side.

On the other hand, as shown in FIG. 6, there are cases where knurling as a design is provided in the region of the side 50K where letters 71 are formed. As mentioned above, the letters 71 can be removed using the model image, but since the model image does not normally have information on a knurled region 72, it is difficult to remove the knurled region 72. As a result, misjudgment could be caused by the inability to distinguish the knurled region 72 from stains and flaws present near it.

The present invention has been made in view of such conventional problems, and an object thereof is to provide a method and apparatus for detecting the shape of the tire side with precision by performing an image processing to remove the knurled region from the tire side.

Means for Solving the Problem

Through close and diligent investigations, the inventors have realized that the knurled region on the tire side "exists extensively" at "a fixed amplitude, frequency, and angle" in the tire circumferential direction and that it presents "higher frequencies" than that of the letters, and eventually conceived this invention. The invention consists in creating a Fourier-transformed image by Fourier-transforming an image having the knurled pattern, identifying and then removing the peaks corresponding to the knurled region from the peaks appearing in the Fourier-transformed image, and inverse-Fourier-transforming the Fourier-transformed image with the peaks corresponding to the knurled region removed, thus obtaining an image of a tire side from which the knurled region has been removed.

According to a first aspect of the present invention, there is provided a method for inspecting the shape of a tire, which comprises the steps of sampling an image of a tire side surface having a knurled region, Fourier-transforming the image of the tire side surface, removing a Fourier component along the tire circumferential direction and a Fourier component along the tire axial direction in the Fourier-transformed image as those corresponding to the knurled region, when the two Fourier components are on a single straight line and at the same time appear in a predetermined shape at predefined intervals on the straight line, obtaining an image of a tire side surface with the knurled region removed by inverse-Fourier-transforming the image from which the Fourier components corresponding to the knurled region have been removed, and determining the acceptability of the shape of the tire by comparing the image with the knurled region removed against a reference image of a tire side surface.

Note that the Fourier components are the frequency components of each of the peaks when an actual image is Fourier-transformed and that when the peaks have widths, they represent frequency components (domains) covering the frequency domains of the peak widths including the peak frequencies.

According to a second aspect of the present invention, there is provided a method for inspecting the shape of a tire, wherein the two Fourier components are determined to be those corresponding to a knurled region when the two Fourier components on the straight line are shaped as crosses.

According to a third aspect of the present invention, there is provided a method for inspecting the shape of a tire, wherein a residual image of the knurled region is removed by binarizing each pixel data of the image of the tire side surface with the knurled region removed.

According to a fourth aspect of the present invention, there is provided an apparatus for inspecting the shape of a tire comprising an image shooting means for shooting an image of unevenness of a tire side surface having a knurled region, an image processing means for inputting an image shot by the image shooting means and processing the image, and an inspection means for inspecting to determine the acceptability of the shape of the tire by comparing the processed image of the unevenness of the tire side surface against a reference image, wherein the image processing means further comprises a Fourier-transforming unit for Fourier-transforming the inputted image of the tire side surface, a knurl component removing unit for removing Fourier components corresponding to the knurled region from the Fourier-transformed image, and an output unit for outputting an image of the tire side surface with the knurled region removed by inverse-Fourier-transforming the image from which the Fourier components corresponding to the knurled region have been removed, and wherein the knurl component removing unit removes a Fourier component along the tire circumferential direction and a Fourier component along the tire axial direction in the Fourier-transformed image as those corresponding to the knurled region when the two Fourier components are on a single straight line and at the same time appear in a predetermined shape at predefined intervals on the straight line.

According to a fifth aspect of the present invention, there is provided an apparatus for inspecting the shape of a tire, wherein the knurl component removing unit is equipped with a means for identifying the two Fourier components as those corresponding to the knurled region when the two Fourier components on the straight line are shaped as crosses.

Effect of the Invention

According to the present invention, an inspection is conducted to determine the acceptability of the shape of a tire side from an image of the tire side surface having a knurled region. An image of the tire side is first Fourier-transformed. Then, when the Fourier component along the tire circumferential direction and the Fourier component along the tire axial direction are on a single straight line and at the same time appear in a predetermined shape at predefined intervals on the straight line, the Fourier components are removed as those corresponding to the knurled region. Then an image of a tire side surface derived by inverse-Fourier-transforming the image from which the Fourier components corresponding to the knurled region have been removed is compared against a reference image of the tire side, thereby determining the acceptability of the tire. Thus, stains, flaws, and the like near the knurled pattern can be detected with certainty, and the shape of the tire side can be inspected with excellent accuracy.

REFERENCE NUMERALS

10 tire
10K side (tire side)
10R knurled region
11 rotating unit
12 rotation angle detecting means
13 light casting means
14 CCD camera
15 coordinate computing means
16 tire shape image forming means
17 tire shape determining means
18 storage means
20 image processing means
21 image input unit
22 Fourier-transformed image creating unit
23 Knurl component identifying unit
24 Knurl component removing unit
25 inverse-Fourier-transforming unit
26 image output unit

BEST MODE FOR CARRYING OUT THE INVENTION

Preferred embodiments of the present invention will be described hereinbelow with reference to the accompanying drawings.

Figure 1:
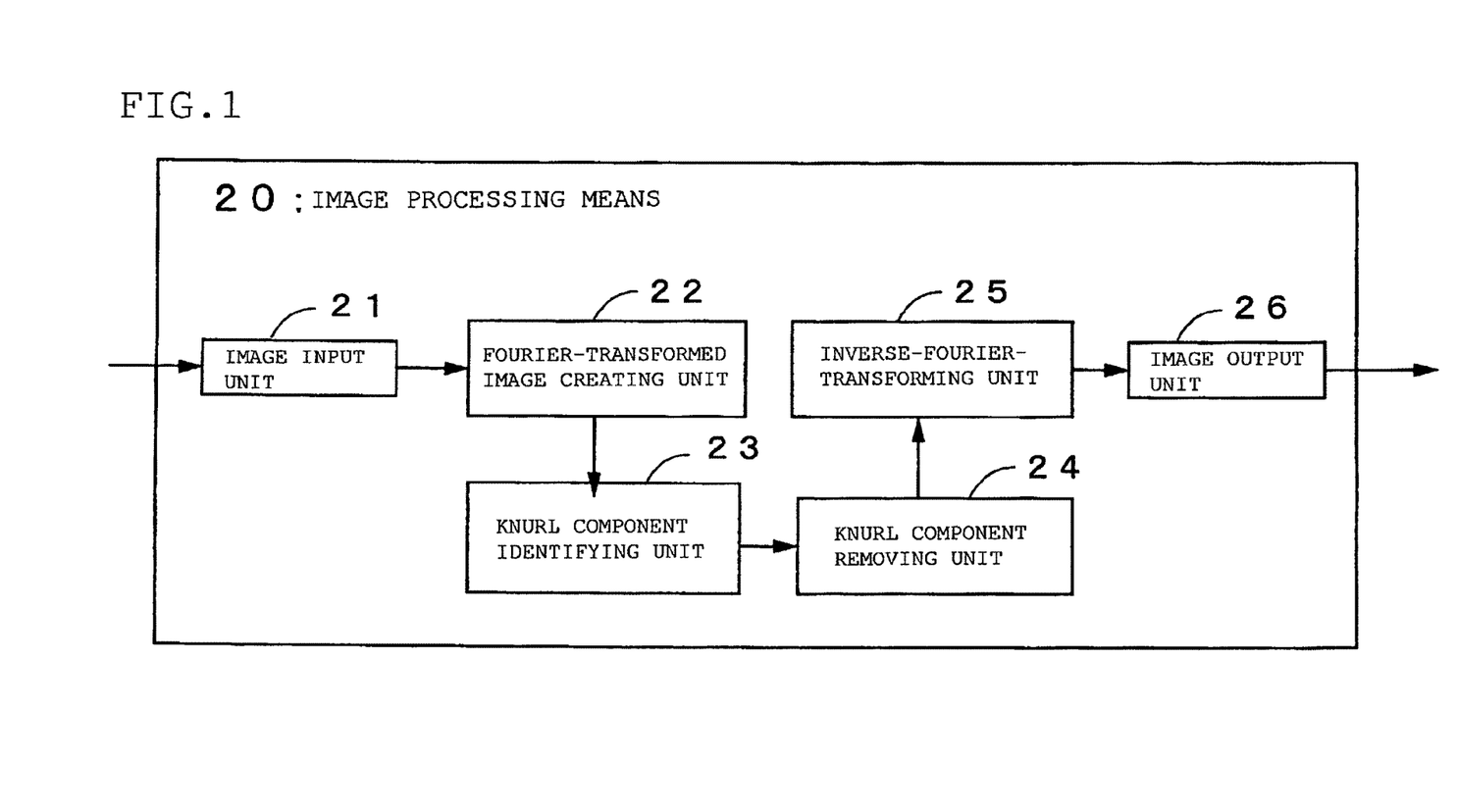
FIG. 1 is a functional block diagram of an image processing unit according to a preferred embodiment of the present invention.
Figure 2:
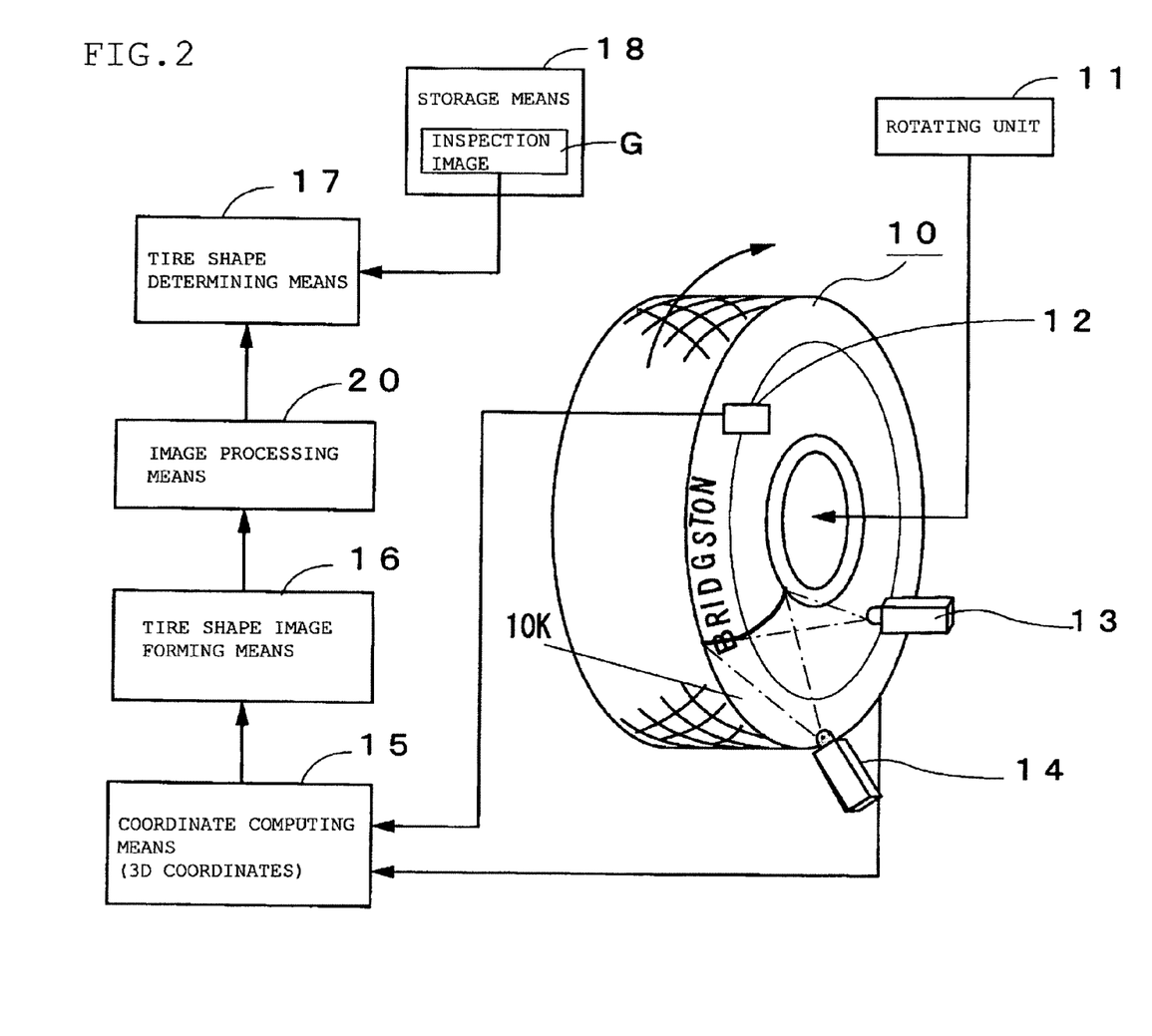
FIG. 2 is an illustration showing a schema of a tire shape inspection apparatus according to a preferred embodiment of the present invention.

FIG. 1 is a functional block diagram of an image processing means 20 for removing a knurled region according to a preferred embodiment of the present invention. FIG. 2 is an illustration showing a schema of a tire shape inspection apparatus using the image processing means 20. In these figures, reference numeral 11 denotes a rotating unit for rotating a tire 10 to be inspected around its axis, 12 a rotation angle detecting means for detecting the angle of rotation of the rotating tire 10, 13 a light casting means for casting a slit light extending in a direction orthogonal to the circumferential direction of the tire 10 on a side 10K of the tire 10, 14 a CCD camera (area camera) for shooting an image (slit image) of a tire surface irradiated by the slit light, 15 a coordinate computing means for computing three-dimensional coordinates of the slit image using the positional relationship between the casting angle of the slit light and the shooting angle of the slit image S, the two-dimensional coordinates of the coordinate-transformed slit image, and the angle of tire rotation detected by the rotation angle detecting means 12, 16 a tire shape image forming means for forming an image of the side 10K for the whole circumference of the tire by joining together the three-dimensional coordinates of the coordinate-transformed slit images, and 17 a tire shape determining means for determining the acceptability of the shape of the tire 10 by comparing the image of the tire side 10K obtained by the tire shape image forming means against an inspection image G which is an image of the shape of the side of a normal tire stored in a storage means 18 in advance.

It is to be noted that the inspection image G has no knurled region.

In the present embodiment, the image processing means 20 for removing the knurled region is disposed posterior to the tire shape image forming means 16 and anterior to the tire shape determining means 17. And an image which has the knurled region removed from the image of the tire side 10K derived by the tire shape image forming means 16 is created there, and it is sent to the tire shape determining means 17.

Thus the tire shape determining means 17 can compare the image with the knurled region removed against the inspection image G, so that it can reliably detect stains, flaws, characters, or the like, which have conventionally been difficult to identify because of the presence of the knurled region.

As shown in FIG. 1, the image processing means 20 includes an image input unit 21, a Fourier-transformed image creating unit 22, a knurl component identifying unit 23, a knurl component removing unit 24, an inverse-Fourier-transforming unit 25, and an image output unit 26.

The image input unit 21 inputs three-dimensional image data (hereinafter referred to as "actual image") of the tire side 10K obtained by the tire shape image forming means 16 and sends it to the Fourier-transformed image creating unit 22. The Fourier-transformed image creating unit 22 creates a Fourier-transformed image by Fourier-transforming the actual image. The knurl component identifying unit 23 identifies peaks attributable to a knurled region 10R that appear in the Fourier-transformed image. The knurl component removing unit 24 removes the peaks identified by the knurl component identifying unit 23 from the Fourier-transformed image. The inverse-Fourier-transforming unit 25 produces an actual image by inverse-Fourier-transforming the Fourier-transformed image from which the peaks attributable to the knurled region 10R have been removed. The image output unit 26 outputs the actual image with the peaks attributable to the knurled region 10R removed to the tire shape determining means 17.

Next, a description will be given of a method for inspecting the shape of the tire side using a tire shape inspection apparatus of the present invention.

First a tire 10 to be inspected is rotated by a rotating unit 11. Then a slit light is cast to a side 10K of the tire 10 from a light casting means 13, and at the same time a slit image S of the side 10K is shot by a CCD camera 14.

Image data of the shot slit image S is sent to a coordinate computing means 15. The coordinate computing means 15 computes three-dimensional coordinates of the slit image of the tire 10 using the positional relationship between the casting angle of the slit light and the shooting angle of the slit image S and the angle of tire rotation detected by the rotation angle detecting means 12, in a technique identical to the conventional light-section method, and sends the three-dimensional coordinates of the slit image to the tire shape image forming means 16.

The tire shape image forming means 16 creates a stereoscopic image of the tire side 10K by combining the three-dimensional coordinates of the slit image at every predetermined rotation angle of the tire.

In the present embodiment, the three-dimensional image data (hereinafter referred to as "actual image") of the tire side 10K obtained by the tire shape image forming means 16 is sent to an image processing means 20, where the peaks attributable to the knurled region 10R on the tire side 10K are removed.

Figure 3:
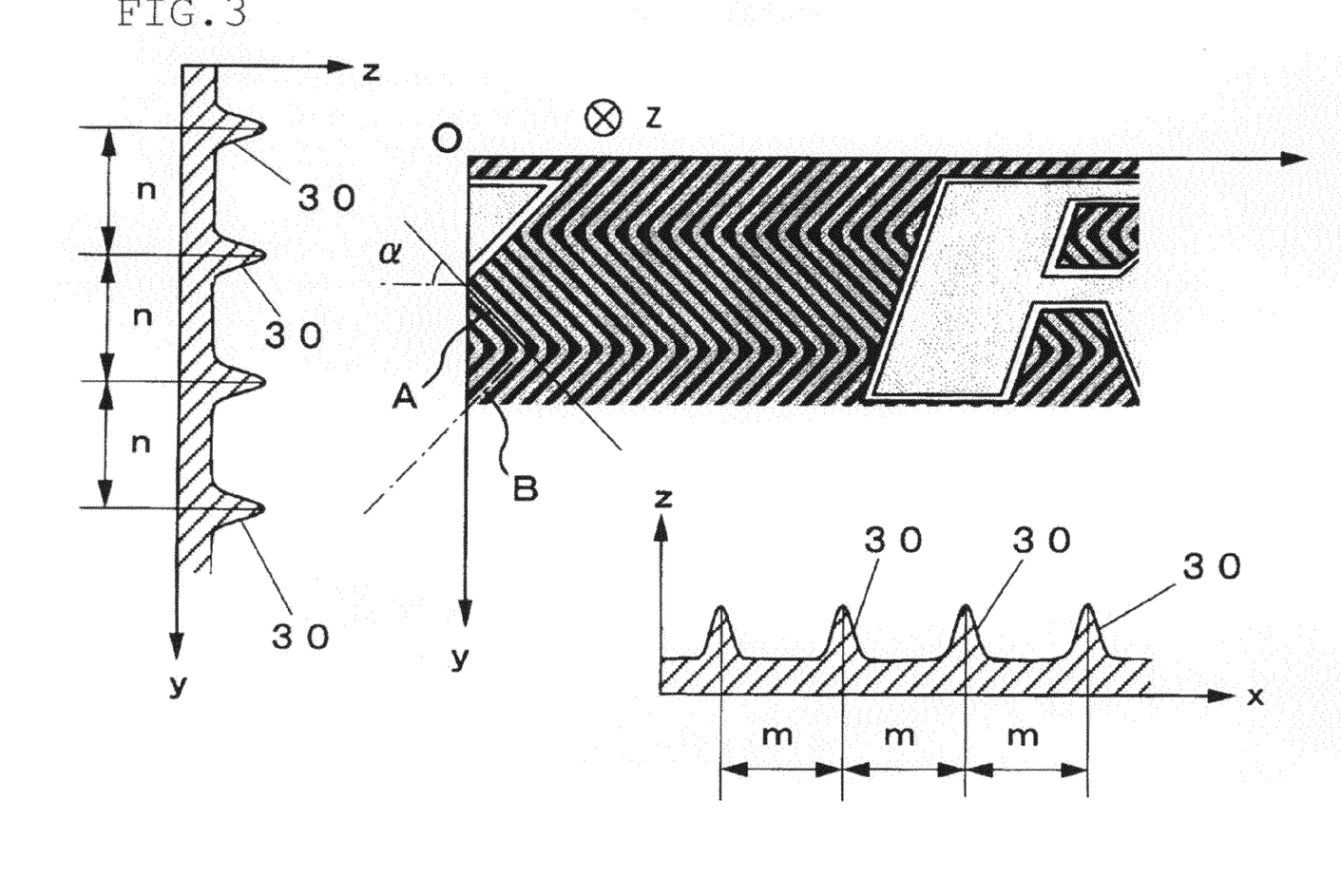
FIG. 3 is an illustration showing an example of an actual image of a tire side having a knurled region.

FIG. 3 is an illustration showing an example of a knurled region 10R within an actual image which is inputted to an image input unit 21 of the image processing means 20. In the figure, the rightward direction (+x axis direction) is the tire circumferential direction, the downward direction (+y axis direction) is the tire radial direction, and the direction perpendicular to the surface of the sheet is the direction perpendicular to the tire side. The knurled region 10R of this example has a knurled pattern of waves progressing in the y-axis direction formed at predetermined intervals in the x-axis direction.

Figure 4:
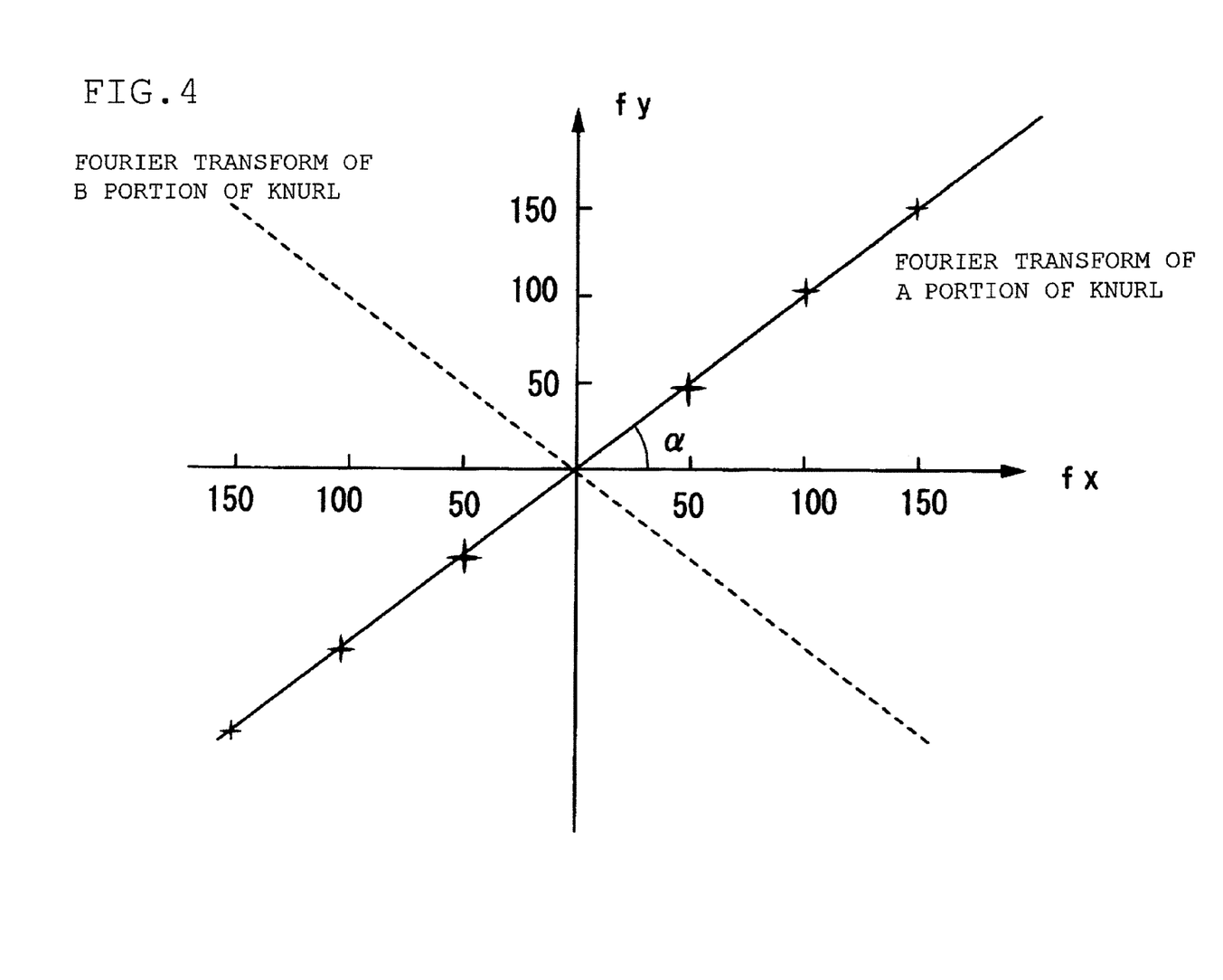
FIG. 4 is a Fourier-transformed image of the tire side of FIG. 3.

The Fourier-transformed image creating unit 22 creates a Fourier-transformed image as shown in FIG. 4 by Fourier-transforming the inputted actual image. As shown in FIG. 3, the knurled region 10R, viewed in cross section, has protruding portions 30 along both the x axis and the y axis, each of which projects from the tire side surface and gets narrower toward the top. These protruding portions 30 of the knurled region 10R, which are formed cyclically in each of the x axis and y axis directions, are arranged at m intervals in the x-axis direction and at n intervals in the y-axis direction. This image is first 1D-Fourier-transformed for each row, namely, each line along the x-axis direction, and then the results are 1D-Fourier-transformed for each column, namely, each line along the y-axis direction. This will create a 2D-Fourier-transformed amplitude characteristic image, as shown in FIG. 4, of the knurled region 10R, which has peaks at frequencies corresponding to the m intervals and the n intervals, respectively. It should be noted that the shape of the protruding portion 30 cannot be approximated by a single sinusoidal wave and therefore the Fourier-transforming results in the appearance of the peaks of double waves, triple waves, and so forth, in addition to the peaks of fundamental waves both in the x-axis direction and the y-axis direction.

Here, the +x axis of the Fourier-transformed image represents the frequencies at which the peaks appear when the actual image is scanned in the +x direction, and the −x axis thereof represents the frequencies at which the peaks appear when the actual image is scanned in the −x direction. Also, the +y axis thereof represents the frequencies at which the peaks appear when the actual image is scanned in the +y direction, and the −y axis thereof represents the frequencies at which the peaks appear when the actual image is scanned in the −y direction. Note that the scan speed may be the same as the rotating speed of the tire when the tire side 10K is shot or otherwise may be set optionally. However, it is preferable that the scan speed in the x-axis direction is the same as the scan speed in the y-axis direction. Thus, the slope of the straight line in the Fourier-transformed image will be the same as the slope of A or B in the actual image.

Therefore, the peaks corresponding to the portion of the knurled pattern indicated by reference letter A (hereinafter referred to as the A portion), which extends diagonally right down at angle α, appear discretely on a straight line with the slope equal to the slope α of the A portion (the solid straight line leading diagonally right up in FIG. 4). And the peaks corresponding to the portion of the knurled pattern indicated by reference letter B (hereinafter referred to as the B portion), which extends diagonally right up, appear discretely on a straight line with the slope equal to the slope of the B portion (the broken straight line leading diagonally left up in FIG. 4).

Also, a knurled pattern is characteristic of the peaks having a frequency width, and therefore the peaks resulting from the knurled region 10R appear discretely at certain frequency intervals (specifically at frequency intervals equal to the frequencies of the fundamental wave) in a cross shape on the above-mentioned straight lines. Also, the higher the frequency, the smaller the size of the cross will be.

Thus, the knurl component identifying unit 23 can identify the cross-shaped peaks appearing discretely at certain frequency intervals on the straight lines in the Fourier-transformed image as the peaks attributable to the knurled region 10R, and the knurl component removing unit 24 can remove the cross-shaped peaks from the Fourier-transformed image.

The inverse-Fourier-transforming unit 25 derives an actual image by inverse-Fourier-transforming the Fourier-transformed image from which the peaks attributable to the knurled region 10R have been removed. This actual image is such that the peaks attributable to the knurled region 10R have been removed. Accordingly, this image can be outputted from the image output unit 26 to the tire shape determining means 17, where the image with the knurled region removed can be compared against the inspection image G stored in the storage means 18. As a result, it is possible to reliably detect stains, flaws, letters, or the like, which have conventionally been difficult to identify because of the presence of the knurled region.

In the preferred embodiment as described hereinabove, the Fourier-transformed image creating unit 22 of the image processing means 20 creates a Fourier-transformed image by Fourier-transforming an actual image of a tire side 10K having a knurled region 10R. The knurl component identifying unit 23 identifies the cross-shaped peaks appearing discretely at certain frequency intervals on the straight lines in the Fourier-transformed image as the peaks attributable to the knurled region 10R. The knurl component removing unit 24 removes the cross-shaped peaks from the Fourier-transformed image. The inverse-Fourier-transforming unit 25 derives an actual image by inverse-Fourier-transforming the Fourier-transformed image from which the peaks attributable to the knurled region 10R have been removed. And the acceptability of the shape of the tire side 10K is determined using this actual image. Thus, it is possible to reliably detect stains, flaws, characters, or the like, which have conventionally been difficult to identify because of the presence of the knurled region. Accordingly, even when the tire to be inspected has a knurled region, the shape of the tire side can be inspected with excellent accuracy.

It should be understood that in the preferred embodiment heretofore described, the knurled region has a wavy knurled pattern with a fixed frequency and angle, but even when the knurled region has a plurality of frequencies and angles, the knurled region can be removed in the same way as in the preferred embodiment.

Also, in the above-described embodiment, the acceptability of the shape of the tire side is determined using an actual image derived by carrying out an inverse-Fourier-transform. However, depending on the knurled pattern, there are cases where a residual image of the knurled pattern remains in the actual image. In such a case, it is preferable that the acceptability of the shape of the tire side is determined after erasing the residual image by performing a binarization on the actual image.

Also, in the above-described embodiment, a description has been given of a method of removing the knurled region from the image of the tire side. The present invention, however, is not limited to the image of the tire side, but is applicable to the case of removing any cyclical pattern from images of various cyclical patterns such as in the knurled region.

Industrial Applicability

As discussed herein, according to the present invention, the tire shape can be detected with high accuracy, and it is possible to raise the efficiency of the tire shape inspection and thus enhance productivity.

The invention claimed is:

1. A method for inspecting a shape of a tire, using an image processing unit, a Fourier-transformed image creating unit, a knurled component removing unit, a tire shape image forming unit, and a tire shape detection unit, the method comprising:

sampling an image of a tire side surface having a knurled region using the image processing unit;

Fourier-transforming the image of the tire side surface using the Fourier-transformed image creating unit;

removing a Fourier component along the tire circumferential direction and a Fourier component along the tire axial direction in the Fourier-transformed image as those corresponding to the knurled region when the two Fourier components are on a single straight line and at the same time appear discretely in a predetermined shape at predefined frequency intervals on the straight line using the knurl component removing unit;

obtaining an image of a tire side surface with the knurled region removed by inverse-Fourier-transforming the image from which the Fourier components corresponding to the knurled region have been removed using the tire shape image forming unit; and determining the acceptability of the shape of the tire by comparing the image with the knurled region removed against a reference image of a tire side surface using the tire shape detection unit.

2. The method for inspecting a shape of a tire according to claim 1, wherein the two Fourier components are determined to be those corresponding to a knurled region when the two Fourier components on the straight line are shaped as crosses.

3. The method for inspecting a shape of a tire according to claim 1, wherein a residual image of the knurled region is removed by binarizing each pixel data of the image of the tire side surface with the knurled region removed.

4. An apparatus for inspecting a shape of a tire, the apparatus comprising:

an image shooting configured to shoot an image of unevenness of a tire side surface having a knurled region;

an image processing unit configured to input an image shot by the image shooting means and processing the image; and an inspection unit configured to inspect to determine the acceptability of the shape of the tire by comparing the processed image of the unevenness of the tire side surface against a reference image, wherein the image processing unit further comprises a Fourier-transforming-unit for Fourier-transforming the inputted image of the tire side surface, a knurl component removing unit for removing Fourier components corresponding to the knurled region from the Fourier-transformed image, and an output unit for outputting an image of the tire side surface with the knurled region removed by inverse-Fourier-transforming the image from which the Fourier components corresponding to the knurled region have been removed, and wherein the knurl component removing unit removes a Fourier component along the tire circumferential direction and a Fourier component along the tire axial direction in the Fourier-transformed image as those corresponding to the knurled region when the two Fourier components are on a single straight line and at the same time appear discretely in a predetermined shape at predefined intervals on the straight line.

5. The apparatus for inspecting a shape of a tire according to claim 4, wherein the knurl component removing unit is equipped with a means for identifying the two Fourier components as those corresponding to the knurled region when the two Fourier components on the straight line are shaped as crosses.

6. The method for inspecting a shape of a tire according to claim 2, wherein a residual image of the knurled region is removed by binarizing each pixel data of the image of the tire side surface with the knurled region removed.

7. A method for inspecting a shape of a tire, using an image processing unit, a Fourier-transformed image creating unit, a knurled component removing unit, a tire shape image forming unit, and a tire shape detection unit, the method comprising:

sampling an image of a tire side surface having a knurled region using the image processing unit;

Fourier-transforming the image of the tire side surface using the Fourier-transformed image creating unit;

removing a Fourier component along the tire circumferential direction and a Fourier component along the tire axial direction in the Fourier-transformed image as those corresponding to the knurled region when the two Fourier components are on a single straight line and at the same time appear discretely in a predetermined shape at predefined frequency intervals on the straight line, such that only Fourier component appearing discretely in the predefined shape at the predefined frequency intervals are removed using the knurl component removing unit;

obtaining an image of a tire side surface with the knurled region removed by inverse-Fourier-transforming the image from which the Fourier components corresponding to the knurled region have been removed using the tire shape image forming unit; and determining the acceptability of the shape of the tire by comparing the image with the knurled region removed against a reference image of a tire side surface using the tire shape detection unit.

8. The method for inspecting a shape of a tire according to claim 7, wherein the two Fourier components are determined to be those corresponding to a knurled region when the two Fourier components on the straight line are shaped as crosses.

9. The method for inspecting a shape of a tire according to claim 7, wherein a residual image of the knurled region is removed by binarizing each pixel data of the image of the tire side surface with the knurled region removed.

10. The method for inspecting a shape of a tire according to claim 8, wherein a residual image of the knurled region is removed by binarizing each pixel data of the image of the tire side surface with the knurled region removed.

11. The apparatus for inspecting a shape of a tire according to claim 4, wherein only Fourier components appearing discretely in the predefined shape at the predefined frequency intervals removed.

* * * * *